United States Patent [19]

Geerdes et al.

[11] Patent Number: 4,505,986
[45] Date of Patent: Mar. 19, 1985

[54] PROCESS FOR COATING WOOD OR WOOD FIBRES-CONTAINING SUBSTRATES, AND AN OXIDATIVELY DRYING COATING COMPOSITION TO BE USED THEREWITH

[75] Inventors: Dirk J. F. Geerdes, Hoogerheide; Klaus H. Zabel, Leidschendam, both of Netherlands

[73] Assignee: Akzo N.V., Arnhem, Netherlands

[21] Appl. No.: 566,985

[22] Filed: Dec. 30, 1983

[30] Foreign Application Priority Data

Dec. 30, 1982 [NL] Netherlands ............... 8205043

[51] Int. Cl.³ .................... B05D 3/02; B32B 27/10
[52] U.S. Cl. ............................ 428/481; 427/161; 427/386; 427/393; 528/128; 528/183; 528/185; 528/195; 528/210
[58] Field of Search ............... 427/386, 440, 393, 161; 528/128, 183, 185, 195, 210; 428/481

[56] References Cited

U.S. PATENT DOCUMENTS 3,926,638 12/1975 Rosen et al. ............... 204/159.15

Primary Examiner—Michael R. Lusignan
Attorney, Agent, or Firm—Stevens, Davis, Miller & Mosher

[57] ABSTRACT

This invention pertains to a process for coating wood or a wood fibres-containing substrate using an oxidatively drying coating composition based on an alkyd resin built up of an ethylenically unsaturated monocarboxylic acid, a saturated di- or polyvalent hydroxyl compound and a specific benzotriazole or benzophenone compound. The coating exhibits improved durability and ensures good protection of the substrate against the effects of ultraviolet radiation.

20 Claims, No Drawings

PROCESS FOR COATING WOOD OR WOOD FIBRES-CONTAINING SUBSTRATES, AND AN OXIDATIVELY DRYING COATING COMPOSITION TO BE USED THEREWITH

The invention relates to a process for coating wood or wood fibres-containing substances with the aid of an oxidatively drying coating composition. The term wood as used herein also refers to plywood and chipboard. Wood fibres-containing substrates are, for instance, softboard and hardboard. For convenience, wood and wood fibres-containing substrates are referred to hereinafter as wood (fibre) substrate.

In practice a transparent coating composition applied to a wood (fibre) substrate will readily get brittle, lose its original appearance and come off the substrate. This is due to degradation both of the coating and the wood (fibre) substrate, which is very much contributed to by the ultraviolet radiation in sunlight. Degradation of the wood (fibre) substrate manifests itself in, for instance, discoloration and deterioration by weathering.

The invention has for its object to provide a coating composition which on the one hand ensures proper and prolonged protection of wood against degradation as a result of absorption of the ultraviolet radiation in sunlight and on the other hand is little sensitive in itself to incident ultraviolet radiation and therefore considerably more durable than the known oxidatively drying coating compositions. Although preference is given to transparent coating compositions, applicant has established that also coating compositions to which hiding pigment have been added display, upon application, a better retention of gloss than known oxidatively drying systems.

It should be added that it has been found that if the coating composition is to be applied to, say, wood, replacement of an aromatic dicarboxylic acid, such as phthalic acid, by a saturated, cycloaliphatic dicarboxylic acid, such as a hexahydrophthalic acid, in oxidatively drying alkyd resins will have a detrimental influence on the durability of the wood itself.

U.S. Pat. No. 3,391,110 discloses a coating composition for glass in which the binder is, for instance, an alkyd resin built up of a polycondensed 2-hydroxybenzophenone having one or two polycondensable hydroxyl groups. As divalent carboxylic acids suitable for the preparation of the alkyd resin it mentions aromatic dicarboxylic acids and maleic acid; in addition aliphatic acids may be used as modifying acids.

The process according to the invention is characterized in that use is made of a coating composition based on an alkyd resin having a number average molecular weight of 800-10000, an acid number of 0-80 and a hydroxyl number of 0-120 and built up of 12-75% by weight of an ethylenically unsaturated monocarboxylic acid having 6-24 carbon atoms, 10-65% by weight of a saturated, di- or polyvalent, cycloaliphatic carboxylic acid having 7-11 carbon atoms, 10-45% by weight of a di- or polyvalent hydroxyl compound and 0.1-8% by weight of a 2-(2'-hydroxy phenyl)-benzotriazole compound and/or a 2-hydroxy benzophenone compound having at least one substituent containing a carboxyl group, an aliphatic or cycloaliphatic hydroxyl group, a carboxyl group esterified with an alkyl group having 1-4 carbon atoms, an epoxy group and/or a primary or secondary amino group.

Examples of suitable ethylenically unsaturated monocarboxylic acids of which the alkyd resin according to the invention may be built up include polycondensable unsaturated aliphatic monocarboxylic acids such as oleic acid and castor oil fatty acids. It is preferred that use should be made of polyunsaturated, aliphatic monocarboxylic acids with isolated and/or conjugated double C—C bonds, such as linseed oil fatty acid, soy bean oil fatty acid, sunflower oil fatty acid, wood oil fatty acid, dehydrated castor oil fatty acid, safflower oil fatty acid, sorbic acid and tall oil fatty acid. Optionally, the monocarboxylic acid used in the preparation of the alkyd resin may partly or entirely be in the form of triglyceride. If desired, use may be made of mixtures of 2 or more monocarboxylic acids. It is preferred that the monocarboxylic acid should be used in an amount such that the alkyd resin is built up of 20-70% by weight of ethylenically unsaturated monocarboxylic acid.

In addition to the afore-mentioned unsaturated monocarboxylic acids, however, one or more other monocarboxylic may be used, for instance: saturated, aliphatic or cycloaliphatic monocarboxylic acids such as pivalic acid, 2-ethylcaproic acid, lauric acid, stearic acid, cyclopentane carboxylic acid, cyclopentane propionic acid, cyclohexane carboxylic acid and tricyclo(5.2.1.0$^{2,6}$)decane-3(4)carboxylic acid. Aromatic carboxylic acids, such as benzoic acid and p-tert. butyl benzoic acid may optionally be present in the alkyd resin in an amount not higher than 20% by weight.

Examples of suitable saturated, di- or polyvalent, cycloaliphatic carboxylic acids having 7-11 carbon atoms which may be used according to the invention include cyclopentane-1,2-dicarboxylic acid, cyclopentane-1,3-dicarboxylic acid, cyclohexane-1,2-dicarboxylic acid, cyclohexane-1,3-dicarboxylic acid, methylcyclohexane-1,2-dicarboxylic acid, endomethylene cyclohexane-1,2-dicarboxylic acid, endoisopropylidene cyclohexane-1,2-dicarboxylic acid, cyclohexane-1,2,4-tricarboxylic acid and cyclohexane-1,2,4,5-tetracarboxylic acid. It is preferred that use should be made of cyclohexane-1,2-dicarboxylic acid. It is preferred that the alkyd resin should be built up of 15-50% by weight of the cycloaliphatic di- or polyvalent carboxylic acid. In addition to these saturated, di- or polyvalent, cycloaliphatic carboxylic acids there may optionally be used smaller amounts of one or more other di- or polyvalent carboxylic acids, the mixture of the di- or polyvalent carboxylic acids (to be referred to hereinafter as polycarboxylic acid mixture) generally containing at least 55 mole % and preferably more than 70 mole % of the saturated, di- or polyvalent cycloaliphatic acid. It is preferred that the polycarboxylic acid mixture should contain not more than 10 mole % of an unsaturated, aliphatic dicarboxylic acid such as maleic acid, fumaric acid or itaconic acid, and preferably not more than 40 mole % of a saturated, aliphatic carboxylic acid, such as adipic acid, azelaic acid, sebacic acid, 2,2,4-trimethyl adipic acid, 1,2,3-propane tricarboxylic acid, 1,1,3-propane tricarboxylic acid, 1,3,3,5-pentane tetracarboxylic acid, or an oligomerized monocarboxylic acid, or preferably not more than 40 mole % of an aromatic polycarboxylic acid and/or unsaturated cycloaliphatic polycarboxylic acid, such as phthalic acid, isophthalic acid, cyclohexene-1,2-dicarboxylic acid and 3,6-endomethylene 1,4-tetrahydrophthalic acid. It is preferred that use should be made of a mixture of cyclohexane-1,2-dicarboxylic acid and a dimeric fatty acid having 24-36 carbon atoms which is commercially available as such or can readily be obtained during the preparation of the alkyd resin upon thermo-polymerization of ethylenically unsaturated monocarboxylic acids with conjugated double bonds. Optionally, the above-envisaged acids may be used in the form of an ester or as an anhydride.

Preferred hydroxy compounds used in the preparation of the alkyd resin are aliphatic and/or cycloaliphatic hydroxyl compounds having 2–8, more particularly 2–4 hydroxyl groups, such as ethylene glycol, propylene glycol, 2,2-dimethyl-1,3-propane diol, 1,6-hexane diol, trimethylol ethane, trimethylol propane, ditrimethylol propane, glycerol, pentaerythritol, dipentaerythritol, tripentaerythritol, 1,4-dimethylol cyclohexane, 1,3-dimethylolcyclohexane, 1,2-cyclohexane diol, 1,4-cyclohexane diol, (3(4),8(9)-dihydroxymethyl-tricyclo[5.2.1.0.$^{2,6}$]decane and hydrogenated bisphenol, or epoxy compounds derived from these polyols, such as propylene oxide, 2,3-epoxy-1-propanol and glycidyl esters of saturated monocarboxylic acids. It is preferred that the alkyd resin should be built up of 12–35% by weight of the dior polyvalent compound(s). The alkyd resin may optionally be modified with compounds such as dimethylol propionic acid; citric acid; 12-hydroxy stearic acid; alkyl ethers containing at least one hydroxyl group or epoxy group, such as the mono- or diallyl ether of trimethylol propane, glycerol, pentaerythritol or sorbitol; alkyl glycidyl ether; aliphatic and/or cycloaliphatic isocyanates, for instance hexamethylene diisocyanate or isophoron diisocyanate, (meth)acrylic acid; aliphatic or cycloaliphatic monoalcohols or hydroxy and/or alkoxy functional silanes, siloxanes or silicones. In the preparation of the alkyd resin use may optionally be made of monofunctional hydroxyl compounds, such as benzyl alcohol, lauryl alcohol, octyl alcohol, oleyl alcohol, linoleyl alcohol, stearyl alcohol or cetyl alcohol.

As examples of suitable 2-(2'-hydroxyphenyl)-benzotriazole compounds or 2-hydroxy benzophenone compounds which according to the invention are chemically built in the alkyd resin, preferably in an amount of 0.5–6% by weight, may be mentioned adducts of a compound of the general formula I or II

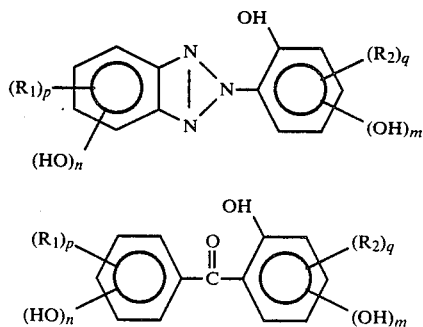

wherein $R_1$ and $R_2$ may be the same or different and represent a halogen atom, an alkyl group or an alkoxy group having 1–18 carbon atoms, a cycloalkyl group having 5–8 atoms, an aryl group or an arylalkyl group having 7–10 carbon atoms, and m and/or n is a whole number or whole numbers, with the proviso that $m+n=1-3$, and p and q are each 0, 1 or 2, and for instance an epoxy compound or an aziridin compound.

Examples of suitable epoxy compounds include ethylene oxide, propylene oxide, glycidol, styrene oxide, 1,2-epoxy decane, glycidyl (meth)acrylate, alkyl glycidyl ethers, glycidyl esters of branched or nonbranched monocarboxylic acids having 8–12 carbon atoms or allyl glycidyl ether. It is preferred that the epoxy compound employed should be glycidol, propylene oxide or a glycidyl ester of a branched fatty acid having 9–11 carbon atoms. More particularly, the adduct used is the addition product of 2-(2',4'-dihydroxyphenyl)-benzotriazole or 2,4-dihydroxybenzophenone and glycidol, propylene oxide or a glycidyl ester of a branched fatty acid having 9–11 carbon atoms. Reaction of one or more phenolic hydroxyl groups and an epoxy compound results in the formation of adducts containing at least one epoxy group or aliphatic hydroxyl group. The formation of the adduct is effected at a temperature of 80°–220° C. and may be accelerated by using catalysts such as quaternary ammonium halides or thiodiglycols. As suitable catalysts used in an amount of 0.01 to 3% by weight may be mentioned tetraethyl ammonium bromide, tetraethyl ammonium chloride and thiodiethylene glycol. The adducts prepared may be built into the alkyd resin by reaction with carboxyl groups and/or isocyanate group-containing compounds, if present.

Examples of suitable aziridin compounds include ethylene imine or N-ethanol ethylene imine. The use of these compounds results in adducts which have terminal amino groups or hydroxyl groups. Consequently, these adducts can readily be built into the alkyd resin to form amide, ester, urea or urethane groups.

Polycondensation for the preparation of the oxidatively drying alkyd resin is usually carried out at a temperature of 140°–300° C., preferably 180°–280° C., and in an inert atmosphere of, for instance, nitrogen and/or carbon dioxide. The water evolved during polycondensation may be removed in the usual manner, for example by distillation under reduced pressure or by azeotropic distillation using an organic solvent, such as toluene or xylene. It is preferred that the alkyd resin should have a number average molecular weight of 1200–8000, an acid number of 0–60 and/or a hydroxyl number of 0–80.

Moreover, the oxidatively drying alkyd resin may be modified with vinyl monomers by graft-polymerization or by mixing with a vinyl polymerisate. It is preferred that in either modification use should be made of vinyl monomers which do not have aromatic structures. Use may be made, however, of limited amounts, for instance of up to not higher than 40% by weight, calculated on the vinyl monomers. The binder to be preferably used in the coating composition comprises 20–100% by weight of oxidatively drying alkyd resin and 0–80% by weight of vinyl polymerisate. For the modification with vinyl monomers by graft-polymerization the alkyd resin is dissolved in a suitable solvent and subsequently a mixture of vinyl monomers and a radical initiator is slowly added to the alkyd resin solution over a period of 1–5 hours. The reaction temperature of the reaction mixture is 70°–180°, depending on the half-life period of the initiator used. After adequate conversion of the vinyl monomers the reaction is stopped. Suitable vinyl monomers which may be used as such or in combination are, for example, styrene, α-methyl styrene, vinyl toluene, vinyl chloride, vinyl acetate, vinyl propionate, vinyl versatate, methyl(meth)acrylate, (iso)butyl(meth)acrylate, (meth)acrylic acid, 2-hydroxy propyl acrylate, dodecyl acrylate, (meth)acrylonitrile, glycidyl methacrylate or isobornyl(meth)acrylate. Optionally, other monomers may be employed in addition, for instance compounds having an oxidatively drying group, such as acrylic or methacrylic esters of oleyl alcohol or linoleyl alcohol, or fatty acid esters of hydroalkyl(meth)acrylates, dodecyl pentenyl(meth)acrylate and dicyclopentenyl oxyethyl(meth)acrylate. Preferably the proportions of the various monomers are so chosen that the calculated glass transition point (Tq) of the vinyl polymer as such is in the range of from −30° to 100° C., and preferably of from −20° to 50° C. Moreover, use may be made of a mixture of an oxidatively drying alkyd resin and a vinyl (co)polymer.

The coating composition according to the invention may optionally contain all kinds of additives, such as pigments, dyes, siccatives, pigment dispersing agents, levelling agents, fillers, stand (oil), UV absorbers, UV stabilizers, antioxidants, antiozonants, delustring agents, anti-sag agents, sterically hindered amines, bactericides, fungicides, anti-skinning agents, finely dispersed waxes, urethane oils and polymers such as maleic resins, hydrocarbon resins, colophonium resins, phenol resins, ketone resins, epoxy resins, silicone resins, polyurethanes or polyurethane alkyd resins.

Examples of suitable pigments include natural or synthetic, transparent or non-transparent pigments. As examples of representative pigments may be mentioned earth pigments, such as ochres, green earths, umbers and burnt or raw siennas. It is preferred, however, that use should be made of iron oxides having an average particle size of 0.001–0.09 μm, and preferably 0.005–0.06 μm. Examples of suitable iron oxides include iron oxide red, iron oxide orange and iron oxide yellow. More particularly, use is made of a mixture of one or more of the afore-mentioned iron oxides with an earth pigment. Pigments are usually employed in an amount not exceeding 150% by weight, preferably 1–100% by weight, based on the alkyd resin (calculated as solid matter). Iron oxides having an average particle size of 0.001–0.09 μm are usually employed in an amount not higher than 20% by weight, preferably 0.1–10% by weight, based on the alkyd resin (calculated as solid matter). Examples of the applicable pigments include colloidal organo-iron complexes, colloidal zinc oxide or titanium dioxide.

As examples of suitable siccatives may be mentioned metal salts of (cyclo)aliphatic acids, such as octanoic acid, linoleic acid and naphthenic acid, or watersoluble metal salts or metal complexes, for instance metal halides or metal acetyl acetonates, suitable metals being, for example, cobalt, manganese, lead, zirconium, calcium, zinc and rare earth metals. Use also may be made of mixtures of siccatives. Generally, the siccatives (calculated as metal) are used in an amount of 0.001 to 3% by weight, calculated on the binder system as solid matter.

As dispersing agent water or, optionally, a water-dilutable organic solvent or an organic solvent may be used. As examples of suitable organic solvents may be mentioned various mineral spirits, xylene, propanol, isobutanol, propoxypropanol, 1,2-propylene glycol, 1,3-propylene glycol, diethylene glycol, ethylene glycol monomethyl ether, 1,2-propylene glycol monobutyl ether, 1,2-propylene glycol monoisobutyl ether, methylethyl ketone, methylisobutyl ketone, 1-methoxy-2-butanol and N-methyl-2-pyrrolidone.

When water is used as a dispersing agent, the binder used may be an alkyd resin having an acid number of 0–80. When an organic solvent is used as a dispersing agent, it is preferred that use should be made of an alkyd resin having an acid number of 0–30.

In actual practice the coating composition is generally applied to the desired substrate in one or more layers by brushing, flow coating, dipping, spraying or roller coating, but also other methods may of course be used. The substrate is preferably a wood (fibre) substrate; if desired, the substrate may be of a metal or an alloy, a synthetic material, an elastomer, brick, natural stone, coats of plastering or glass. The compositions are very suitable for use as primer or as top coat, for instance in thicknesses of 5–200 μm (measured in the dried state).

The invention also relates to an oxidatively drying coating compositin based on an alkyd resin as binder, the alkyd resin having a number average molecular weight of 800–10000, an acid number of 0–80 and a hydroxyl number of 0–120 and being built up of 12–75% by weight of an ethylenically unsaturated monocarboxylic acid having 6–24 carbon atoms, 10–65% by weight of a saturated, di- or polyvalent cycloaliphatic carboxylic acid having 7–11 carbon atoms, 10–45% by weight of a di- or polyvalent hydroxyl compound and 0.1–8% by weight of a 2-(2'-hydroxyphenyl)-benzotriazole compound and/or a 2-hydroxybenzophenone compound having at least one substituent containing a carboxyl group, an aliphatic or cycloaliphatic hydroxyl group, a carboxyl group esterified with an alkyd group having 1–4 carbon atoms, an epoxy group and/or a primary or secondary amino group.

The invention will be further described in the following examples. In them the solids content is, unless otherwise indicated, determined by heating the composition for 1 hour at 105° C. in accordance with ASTMD-1650; the colour is determined in accordance with the Gardner 1933-scale and the viscosity with the aid of the Epprecht viscometer at 20° C. and expressed in Pa.s. The values of the acid number are given in mg KOH per gramme of solid resin.

PREPARATION OF ADDITION PRODUCT A

To a reaction vessel equipped with a stirrer and a thermometer there are charged 214 g (1 mole) of 2,4-hydroxybenzophenone, which is heated to 175° C. over a period of 2 hours. Subsequently, 0.3 g of tetraethyl ammonium bromide and 81.4 g (1.1 mole) of 2,3-epoxy-1-propanol are added to the contents of the reaction vessel over a period of 3 hours. After heating to 200° C. and maintaining this temperature for 2 hours the reaction is terminated by cooling. The resulting addition product is obtained in an amount of 295 g.

PREPARATION OF ADDITION PRODUCT B

The same procedure is applied as for the preparation of addition product A, except that use is made of 227 g (1 mole) of 2-(2',4'-dihydroxyphenyl)benzotriazole instead of the 214 g of 2,4-dihydroxybenzophenone. An addition product having a crystalline appearance is obtained in an amount of 308 g.

PREPARATION OF ADDITION PRODUCT C

The same procedure is employed as for the preparation of addition product A, except that instead of the 214 g of 2,4-dihydroxybenzophenone use is made of 246 g (1 mole) of 2,2',4,4'-tetrahydroxybenzophenone and instead of the 81.4 g of 2,3-epoxy-1-propanol use is made of 539 g (2.2 moles) of the glycidyl ester of a branched fatty acid having 9–11 carbon atoms (available under the trade mark Cardura E of Shell).

An addition product having 2 esterifiable aliphatic hydroxyl groups is obtained in an amount of 785 g.

PREPARATION OF ADDITION PRODUCT D

To a reaction vessel fitted with a stirrer and a thermometer 227 g (1 mole) of 2-(2',4'-dihydroxyphenyl)-benzotriazole are charged and heated for 2 hours to 155° C. Subsequently, 0.4 g of tetraethyl ammonium bromide and 120 g (1.50 moles) of allyl glycidyl ether are added to the contents of the reaction vessel over a period of 3 hours. After gradual heating to 200° C., which temperature is maintained for 2 hours, 154 g (1 mole) of hexahydrophthalic anhydride are added to the reaction product formed. The temperature is maintained at 200° C. for 1 hour, after which the reaction is terminated by cooling. An addition product having an average 1 esterifiable carboxyl group is obtained in an amount of 501 g.

COMPARATIVE EXAMPLE 1

In a reaction vessel equipped with a stirrer, a thermometer and a water outlet on oxidatively drying alkyd resin is prepared by intermixing 61.35 g (0.07 moles) of soy bean oil, 12.56 g (0.091 moles) of pentaerythritol and 0.05 g of lithium ricinoleate. These compounds are heated for 3 hours to 260° and maintained at this temperature until the mass in the reaction vessel has a clear appearance and a good solubility of 1 part of the reactor contents in 3 parts of ethanol is attained. Subsequently, the reaction mixture is cooled to 200° C. and 24.72 g (0.167 moles) of phthalic anhydride and 4 g of xylene are added to the contents of the reactor. Next, the material is heated for 4 hours to 240° C. and kept at this temperature until an acid number of 10 is reached. After cooling to 100° C. 37 g of white spirit are added. There are obtained 136 g of an alkyd resin solution having a solids content of 70.1% by weight, an acid number of 9.5, a viscosity of 4.05 Pa.s and a colour 2.

COMPARATIVE EXAMPLE 2

Comparative Example 1 is repeated, except that 0.167 moles of phthalic anhydride are replaced by 0.167 moles of hexahydrophthalic anhydride. There are obtained 137.5 g of an alkyd resin solution having a solids content of 69.8% bij weight, an acid number of 8, a viscosity of 1.50 Pa.s and a colour 2.

COMPARATIVE EXAMPLE 3

In the reaction vessel used in Comparative Example 1 61.3 g (0.07 moles) of soy bean oil, 11.5 g (0.083 moles) of pentaerythritol and 0.05 g of lithium ricinoleate are intermixed, followed by heating these compounds for 3 hours to 260° C. After transesterification the material is cooled to 200° C. and 4.0 g of the addition product A, 24.7 g (0.167 moles) of phthalic anhydride and 4 g of xylene are successively added to the contents of the reactor. After polycondensation at 240° C. to an acid number of 11, cooling to 180° C. and adding 38 g of white spirit there are obtained 138 g of alkyd resin solution having a solids content of 69.9% by weight, an acid number of 10.4, a viscosity of 4.93 Pa.s and a colour 4.

EXAMPLE 1

In the reaction vessel of Comparative Example 1 there are intermixed 61.3 g (0.07 moles) of soy bean oil, 11.5 g (0.083 moles) of pentaerythritol and 0.05 g of lithium ricinoleate, after which these compounds are heated for 3 hours to 260° C. Transesterification is followed by cooling to 200° C. and successively adding 4.0 g of the addition product A, 25.7 g (0.167 moles) of hexahydrophthalic anhydride and 4 g of xylene to the contents of the reactor. After polycondensation at 240° C. to an acid number of 10, cooling to 180° C. and adding 38 g of white spirit there are obtained 139 g of alkyd resin solution having a solids content of 69.8% by weight, an acid number of 9.5, a colour 3 and a viscosity of 2.71 Pa.s.

EXAMPLE 2

Example 1 is repeated, except that instead of the 4.0 g of the addition product A 10 g of addition product C are used. After polycondensation at 240° C. to an acid number of 9, cooling to 180° C. and adding 40 g of white spirit there are obtained 147 g of alkyd resin solution having a solids content of 70.0% by weight, an acid number of 10.2 a colour 4 and a viscosity of 2.98 Pa.s.

EXAMPLE 3

In the reaction vessel of Comparative Example 1 there are intermixed 137.7 g of tall oil fatty acids (0.490 moles), 35.0 g (0.254 moles) of pentaerythritol, 39.3 g (0.255 moles) of hexahydrophthalic anhydride and 8.5 g of addition product A, after which these compounds are heated in 4 hours to 250° C. After adding 8 g of xylene the material is subjected to polycondensation at 250° C. to an acid number of 12. After cooling to 180° C. and adding 79 g of white spirit there are obtained 292 g of alkyd resin solution having a solids content of 70.2% by weight, an acid number of 11, a colour 5 and a viscosity of 3.65 Pa.s.

EXAMPLE 4

Example 3 repeated, except that the 8.5 g of addition product A are replaced by an equimolar amount (9.3 g) of the addition product B. There are obtained 295 g of alkyd resin solution having a solids content of 69.1%, an acid number of 13, a viscosity of 3.45 Pa.s and a colour 4.

EXAMPLE 5

Example 4 is repeated, except that the hexahydrophthalic anhydride is used in an amount of 37.1 g (0.241 moles) and the 8.5 g of addition product A are replaced by 11.7 g of addition product D. After polycondensation to an acid number of 8, cooling to 180° C. and adding 80 g of white spirit there are obtained 293 g of alkyd resin solution having a solids content of 69.8% by weight, an acid number of 7.5, a colour 4 and a viscosity of 3.02 Pa.s.

EXAMPLE 6

Example 3 repeated, except that 0.10 moles of the tall oil fatty acids are replaced by an equimolar amount (58 g) of dimeric fatty acids having 36 carbon atoms per molecule (available under the trade mark Prepol 1022 of Unichema Chemie). Moreover, part (137 g) of the pentaerythritol is replaced by the equivalent amount of 1,1,1-trimethylol propane. After adding 81 g of white spirit there are obtained 294 g of alkyd resin solution having a solids content of 70.3% by weight, an acid number of 9.5, a viscosity of 2.57 Pa.s. and a colour 5.

EXAMPLE 7

In the reactor of Comparative Example 1 there are intermixed 75.6 g (0.271 moles) of safflower oil fatty acids, 4.1 g of dimeric fatty acids (0.007 moles) having about 36 carbon atoms (available under the trade mark Prepol 1014 of Unichema Chemie), 20.0 g (0.0130 moles) of hexahydrophthalic anhydride, 61.1 g (0.456 moles) of 2,2-dimethylol propionic acid, 5.5 g (0.041 moles) of 1,1,1-trimethylol propane, 3.8 g of addition product B and 5 g of xylene. These compounds are heated for 3 hours to 230° C. and kept at that temperature until the reaction mixture has an acid number of 47. Subsequently, the xylene is removed from the reaction mixture under reduced pressure and after the temperature of the mixture has been decreased to 150° C., 24 g of ethylene glycol monobutyl ether are added. After cooling the resulting 78% by weight of alkyd resin solution to 80° C. the resin is neutralized with 11.0 g of dimethyl ethanolamine and subsequently diluted with 69 g of water. There are obtained 260 g of aqueous alkyd resin solution having a solids content of 60.2% by weight, a viscosity of 8.32 Pa.s, a colour 5 and an acid number of 44.7.

EXAMPLE 8

In the reactor of Comparative Example 1 there are intermixed 143.2 g of dehydrated castor oil fatty acids (0.515 moles); of which 50% is 9,11-octadecadienoic acid), 19.1 g (0.139 moles) of pentaerythritol, 21.3 g (0.159 moles) of 1,1,1-trimethylol propane, 37.3 g (0.242 moles) of hexahydrophthalic anhydride and 7.3 g of addition product A, after which these compounds are heated for 4 hours to 250° C. After adding 8 g of xylene the material is subjected to polycondensation until the mixture has an acid number of 10. After cooling the reaction mixture to 180° C. 97 g of white spirit are added. Subsequently, a mixture of 63 g of n-butyl acrylate, 7 g of methyl methacrylate and 1.8 g of di-tertiary butyl peroxide are added to the reactor contents over a period of 2 hours at 150° C. After keeping the resulting mixture at 150° for another two hours 0.9 g of di-tertiary butyl peroxide are added for adequate conversion of the acrylate monomers to copolymers and the mass then obtained is kept at 150° C. for 2 hours. There are obtained 386 g of a solution of an acrylated alkyd resin having a solids content of 70.2% by weight, an acid number of 7.8, a colour 4 and a viscosity of 1.60 Pa.s.

EXAMPLE 9

In the reactor of Comparative Example 1 84 g of safflower oil fatty acids (0.3 moles) and 22 g (0.15 moles) of pentaerythritol are intermixed, after which these compounds are heated for 2 hours to 200° C. After this temperature has been maintained for 1 hour, during which period reaction water is split off, 8 g of the addition product B, 11 g (0.071 moles) of hexahydrophthalic anhydride and 5 g of xylene are added to the reactor contents. Next, the reaction mixture is heated for 2 hours to 250° and kept at this temperature until an acid number of 7 is obtained. After cooling to 120° C. successively 53 g of white spirit and 17.1 g (0.077 moles) of isophorondiisocyanate are added to the contents of the reactor over a period of 45 minutes at 90° C. After the temperature has been maintained at 90° C. for 3 hours, the reaction is stopped. There are obtained 193 g of an alkyd resin modified with isocyanate and having a solids content of 70.4% by weight, an acid number of 6.3, a viscosity of 3.94 Pa.s and a colour 5.

TESTING NON-PIGMENTED COATING COMPOSITIONS

After the addition of driers in the form of lead naphthenate (1% by weight of lead metal, calculated on the solid resin), cobalt naphthenate (0.05% by weight of cobalt metal, calculated on the solid resin) and calcium naphthenate (0.2% by weight of calcium metal, calculated on the solid resin), 45.3 parts by weight of the oxidatively drying alkyd resin solutions obtained in the (comparative) examples are diluted to a viscosity of 35 sec. at 20° (Din Cup No. 4) with water (Example 7) or white spirit (other comparative examples). The resulting, clear coating compositions are applied to deal test panels in a coating thickness of about 50 μm (after drying) and tested for 500 hours in a Weather-O-Meter ® or subjected to 19 months' outdoor exposure. For the assessment of the appearance of the coating or the wood after the tests see Table 1.

TABLE 1

| Coating composition | Appearance after 500 hours' Weather-O-Meter of | | Appearance after 19 months' outdoor exposure of | |
|---|---|---|---|---|
| | Coating | Wood | Coating | Wood |
| Comparative example | | | | |
| 1 | cracks; much flaking; high loss of gloss | high deterioration by weathering and discoloration | small cracks; high loss of gloss | deterioration by weathering |
| 2 | flaking; loss of gloss | high deterioration by weathering and discoloration | micro-cracks; moderate loss of gloss | high deterioration by weathering |
| 3 | little flaking; loss of gloss | moderately deteriorated by weathering; little discoloration | micro-cracks; loss of gloss | little deterioration by weathering |
| Examples | | | | |
| 1-3 | intact; little loss of gloss | moderately deteriorated by weathering; little discoloration | intact; little loss of gloss | little deterioration by weathering |
| 4-5 | intact; very little loss of gloss | little deterioration by weathering; very little discoloration | intact; very little loss of gloss | very little deterioration by weathering |
| 6 | intact; very little loss of gloss | little deterioration by weathering; very little discoloration | intact; very little loss of gloss | little deterioration by weathering |
| 7 | intact; very little loss of gloss | very little deterioration by weathering; little discoloration | intact; little loss of gloss | little deterioration by weathering |
| 8 | intact; little loss of gloss | moderately deteriorated by weathering; | intact; little loss of gloss | little deterioration |

TABLE 1-continued

| Coating composition | Appearance after 500 hours' Weather-O-Meter of | | Appearance after 19 months' outdoor exposure of | |
|---|---|---|---|---|
| | Coating | Wood | Coating | Wood |
| 9 | intact; very little loss of gloss | little discoloration very little deterioration by weathering; little discoloration | intact; very little loss of gloss | by weathering very little deterioration by weathering |

TESTING PIGMENTED COATING COMPOSITIONS

Pigmenting with Umber

The alkyd resin solution obtained according to Comparative Example 1 is pigmented with burnt umber by mixing 47.3 parts by weight of the resin solution with 5.8 parts by weight of a pigment paste composed of 54% by weight of linseed stand oil, 36.4% by weight of umber and 9.6% by weight of white spirit. To the resulting mixture driers are added in the form of 0.4 parts by weight of a 6% by weight solution of cobalt naphthenate, 1.3 parts by weight of a 24% by weight solution of lead naphthenate and 1.0 part by weight of a 5% by weight solution of calcium naphthenate and the mixture is subsequently brought to brushing viscosity by adding 44.2 parts by weight of white spirit.

Pigmenting with Iron Oxide

The alkyd resin solutions obtained in the Comparative Examples and the Examples 1, 3, 4 and 6 are pigmented with iron oxide red having an average particle size of 0.01 μm and a specific surface area of 100 m²/g (measured by the BET method) by mixing 48.0 parts by weight of each of the resin solutions with 4.0 parts by weight of a 40% by weight pigment paste of the iron oxide red in the respective alkyd resin. To the resulting mixture are added the following driers: 0.55 parts by weight of a 6% by weight solution of cobalt octoate, 0.6 parts by weight of a 24% by weight solution of zirconium naphthenate and 1.35 parts by weight of a 5% by weight solution of calcium octoate and the mixture is subsequently brought to brushing viscosity by adding white spirit.

A 78% by weight alkyd resin solution (which is not yet neutralized or diluted with water) is pigmented with iron oxide yellow having an average particle size of 0.02 μm and a specific surface area of 90 m²/g (measured by the BET method) by mixing 36.0 parts by weight of the resin solution with 4.0 parts by weight of ethylene glycol monobutyl ether and with 4.0 parts by weight of a pigment paste composed of 40% by weight of the iron oxide, 10% by weight of a nonionic emulsifier (a nonylphenol glycol ether) and 50% by weight of a mixture of water and ethylene glycol in a weight ratio of 80:20. Subsequently, 10 parts by weight of triethylamine are added at a temperature of 90° C. and after cooling the following driers are added to the resin solution: 0.4 parts by weight of a 6% by weight solution of cobalt naphthenate, 1.3 parts by weight of a 24% by weight solution of lead naphthenate and 1.0 part by weight of a 5% by weight solution of calcium naphthenate. Finally, the solution is brought to brushing viscosity by adding water.

All resulting pigmented coating compositions are applied to deal test panels in a coating thickness of about 50 μm (after drying) and subjected to 12 months' outdoor exposure in Florida. For the assessment of the appearance of the coating or the wood after the test see Table 2.

TABLE 2

| Pigmented coating composition based on the composition of | Pigment system | Appearance after 12 months' Florida of | |
|---|---|---|---|
| | | coating | wood |
| Comparative Example | | | |
| 1 | Umber | Cracks; comes off | High deterioration by weathering; wood cracked and highly discolored |
| 1 | Iron oxide | Micro cracks; comes off partly | Moderate deterioration by weathering; little discoloration |
| 2 | Iron oxide | Intact | Slightly deteriorated by weathering |
| 3 | Iron oxide | Intact | Slightly deteriorated by weathering |
| Example | | | |
| 1 | Iron oxide | Intact | No deterioration by weathering = NDBW |
| 3 | Iron oxide | Intact | No deterioration by weathering |
| 4 | Iron oxide | Intact | No deterioration by weathering |
| 6 | Iron oxide | Intact | No deterioration by weathering |
| 7 | Iron oxide | Intact | No deterioration by weathering |

Pigmenting with Titanium Dioxide

The alkyd resin solutions obtained in the Comparative Examples 1, 2 and 3 and that of Example 1 are tested for durability when used in compositions pigmented with rutile titanium white (available under the trade mark Kronos RN-59 of Kronos). For the preparation of the coating compositions 143 g of resin solution, 23 g of white spirit, 75 g of the titanium dioxide and 3 g of calcium naphthenate (0.15% by weight of calcium metal, calculated on the solid resin) are intermixed and ground to the desired degree of fineness of the pigment particles on a three-roll mill. Subsequently, there are added 0.875 g of a 6% by weight solution of cobalt naphthenate and 4.1 g of a 24% by weight solution of lead naphthenate, after which the coating compositions are diluted with white spirit to a viscosity of 50 sec. at 20° C. (Din Cup No. 4). The resulting coating compositions are applied to steel test panels (Bonder 130) in a coating thickness of about 70 μm (after drying). The coated test panels are placed in a Weather-O-meter ® for 500 hours and subjected to outdoor exposure for 24 months. For the results obtained see Table 3.

TABLE 3

| Pigmented coating composition based on the composition of | Appearance of coating after | |
|---|---|---|
| | 500 hours' Weather-O-Meter | 24 months' outdoor exposure |
| Comparative Example | | |

TABLE 3-continued

| Pigmented coating composition based on the composition of | Appearance of coating after | |
|---|---|---|
| | 500 hours' Weather-O-Meter | 24 months' outdoor exposure |
| 1 | microcracks; high loss of gloss | intact; loss of gloss |
| 2 | intact; loss of gloss | intact; little loss of gloss |
| 3 | intact; loss of gloss | intact; little loss of gloss |
| Example | | |
| 1 | intact; little loss of gloss | intact; very little loss of gloss |

We claim:

1. A process for coating wood or wood fibres-containing substrates with the aid of an oxidatively drying coating composition, characterized in that use is made of a coating composition based on an alkyd resin having a number average molecular weight of 800–10000, an acid number of 0–80 and a hydroxyl number of 0–120 and built up of 12–75% by weight of an ethylenically unsaturated monocarboxylic acid having 6–24 carbon atoms, 10–65% by weight of a saturated, di- or polyvalent, cycloaliphatic carboxylic acid having 7–11 carbon atoms, 10–45% by weight of a di- or polyvalent hydroxyl compound and 0,1–8% by weight of a 2-(2'-hydroxyphenyl)-benzotriazole compound and/or a 2-hydroxy benzophenone compound having at least one substituent containing a carboxyl group, an aliphatic or cycloaliphatic hydroxyl group, a carboxyl group esterified with an alkyl group having 1–4 carbon atoms, an epoxy group and/or a primary or secondary amino group.

2. A process according to claim 1, characterized in that said coating composition is transparent.

3. A process according to claim 1, characterized in that 20–70% by weight of the alkyd resin consists of ethylenically unsaturated monocarboxylic acid.

4. A process according to claim 1, characterized in that the di- or polyvalent cycloaliphatic carboxylic acid of which the alkyd resin is partly built up is cyclohexane-1,2-dicarboxylic acid.

5. A process according to claim 1, characterized in that 15–50% by weight of the alkyd resin consists of the saturated di- or polyvalent cycloaliphatic carboxylic acid.

6. A process according to claim 1, characterized in that the di- or polyvalent hydroxyl compound of which the alkyd resin is partly built up is an aliphatic and/or cycloaliphatic hydroxyl compound having 2–8 hydroxyl groups.

7. A process according to claim 6, characterized in that the aliphatic and/or cycloaliphatic hydroxyl compound has 2–4 hydroxyl groups.

8. A process according to claim 1, characterized in that 12–35% by weight of the alkyd resin consists of a di- or polyvalent hydroxyl compound.

9. A process according to claim 1, characterized in that the benzotriazole or benzophenone compound of which the alkyd resin is partly built up is an addition product of a compound of the general formula

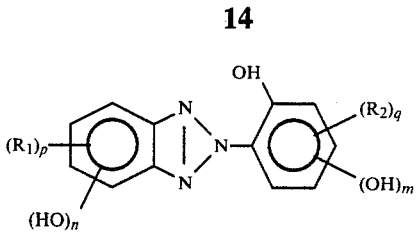

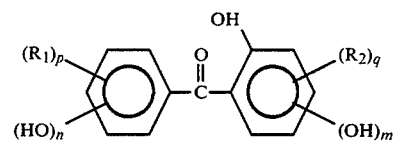

wherein $R_1$ and $R_2$ may be the same or different and represent a halogen atom, an alkyl group or an alkoxy group having 1–18 carbon atoms, a cycloalkyl group having 5–8 carbon atoms, an aryl group or an arylalkyl group having 7–10 carbon atoms, and m and/or n is a whole number or whole numbers, with the proviso that $m+n=1-3$, and p and q are each 0, 1 or 2, and an epoxy compound or an aziridin compound.

10. A process according to claim 9, characterized in that the epoxy compound is glycidol, propylene oxide or a glycidyl ester of a branched fatty acid having 9–11 carbon atoms.

11. A process according to claim 1, characterized in that the alkyd resin is partly built up of an addition product of 2-(2',4'-dihydroxyphenyl)-benzotriazole or 2,4-dihydroxy benzophenone and glycidol, propylene oxide or a glycidyl ester of a branched fatty acid having 9–11 carbon atoms.

12. A process according to claim 1, characterized in that the alkyd resin has a number average molecular weight of 1200–8000, an acid number of 0–60 and/or a hydroxyl number of 0–80.

13. A process according to claim 1, characterized in that the coating composition contains an iron oxide having an average particle size of 0.001–0.09 μm.

14. A process according to claim 1, characterized in that the coating composition contains an iron oxide having an average particle size of 0.005–0.06 μm.

15. A process according to claim 1, characterized in that the coating composition contains a mixture of an earth pigment and an iron oxide having an average particle size of 0.001–0.09 μm.

16. A process according to claim 1, characterized in that the iron oxide is present in the coating composition in an amount not higher than 20% by weight, based on the alkyd resin (calculated as solid matter).

17. A process according to claim 1, characterized in that the coating composition contains water and/or an organic solvent.

18. An oxidatively drying coating composition based on an alkyd resin as binder, characterized in that the alkyd resin has a number average molecular weight of 800–10000, an acid number of 0–80 and a hydroxyl number of 0–120 and is built up of 12–75% by weight of an ethylenically unsaturated monocarboxylic acid having 6–24 carbon atoms, 10–65% by weight of a saturated, di- or polyvalent cycloaliphatic carboxylic acid having 7–11 carbon atoms, 10–45% by weight of a di- or polyvalent hydroxyl compound and 0.1–8% by weight of a 2-(2'-hydroxyphenyl)-benzotriazole compound and/or a 2-hydroxybenzophenone compound having at least one substituent containing a carboxyl group, an aliphatic or cycloaliphatic hydroxyl group, a carboxyl group esterified with an alkyl group having 1–4 carbon atoms, an epoxy group and/or a primary or secondary amino group.

19. A process for coating a substrate with the aid of an oxidatively drying coating composition according to claim 18.

20. Coated substrate obtained by the process according to claim 19.

* * * * *